United States Patent [19]

Radacanu

[11] Patent Number: 4,492,910

[45] Date of Patent: Jan. 8, 1985

[54] CONTROL CIRCUIT FOR A TIMING MOTOR

[75] Inventor: Dan-Corneliu Radacanu, Bad Soden, Fed. Rep. of Germany

[73] Assignee: Braun Aktiengesellschaft, Kronberg, Fed. Rep. of Germany

[21] Appl. No.: 486,760

[22] Filed: Apr. 20, 1983

[30] Foreign Application Priority Data

Apr. 24, 1982 [DE] Fed. Rep. of Germany ....... 3215440

[51] Int. Cl.³ .............................................. H02P 5/16
[52] U.S. Cl. ................................... 318/772; 318/703; 318/757
[58] Field of Search ............... 318/615, 672, 685, 696, 318/706, 707, 724, 757, 759–762, 778, 779, 785, 786, 798–806, 459, 461, 463, 495, 408, 340

[56] References Cited

U.S. PATENT DOCUMENTS

| | | | |
|---|---|---|---|
| 4,238,717 | 12/1980 | Knight et al. | 318/703 |
| 4,275,343 | 6/1981 | Fulton et al. | 318/704 |
| 4,322,672 | 3/1982 | Walker | 318/805 |
| 4,401,933 | 8/1983 | Davy et al. | 318/786 |

OTHER PUBLICATIONS

The Technology of Quartz Watches, G. Glaser, pp. 142–161.

*Primary Examiner*—E. A. Goldberg
*Assistant Examiner*—A. Evans
*Attorney, Agent, or Firm*—Raymond J. De Vellis

[57] ABSTRACT

In a method and apparatus for regulating the rotational speed of a motor having a rotor with magnetic poles and a stator with at least two coils, wherein during a first operational mode the sinusoidal voltage included in a first of the coils is digitized to produce first and second streams of rectangular pulses, the first pulse stream being compared with a reference frequency pulse signal as regards width and phase to generate accelerating or braking driving pulses supplied to the second coil, the second pulse stream being monitored to determine the rotational speed of the rotor and a second operational mode being instituted whenever the rotor speed falls below a predetermined value, in said second operational mode the rotor speed being accelerated through the application of driving pulses alternately to the first and second coils, the improvement wherein, following the switchover from the self starting mode to the nominial running mode of operation, during a transitional period for a specified time interval, the first pulse stream is compared with the reference pulse signal at a monitoring frequency that is a multiple of the monitoring frequency employed during the nominal running mode of operation after expiration of the specified time interval.

3 Claims, 21 Drawing Figures

CONTROL CIRCUIT FOR A TIMING MOTOR

BACKGROUND OF THE INVENTION

1. Field of the Invention

This invention relates to a method and apparatus for regulating the rotational speed of a timing motor having a rotor with at least one pair of magnetic poles and a stator with at least two coils. The invention has particular applicability to time keeping devices, most particularly those which are battery driven.

2. Description of the Prior Art

U.S. patent application Ser. No. 213,785 filed on Dec. 8, 1980, now U.S. Pat. No. 4,449,086 assigned to the same assignee as the present application and hereby expressly incorporated by reference, describes a method and apparatus for regulating the speed of such a timing motor, paticularly when adverse forces are applied to the rotor which would tend to disrupt its timed and synchronous rotation. The control circuit there described is operable in two modes: a normal running mode (or single coil driving mode), wherein one of the two stator coils is utilized as a sensor coil and the other coil acts as a working coil, and a self-starting mode (or double coil driving mode), wherein both stator coils are alternately energized to accelerate the rotor to a desired rotational speed whenever the rotor speed decreases by a given amount below a predetermined speed.

In the nominal running mode, the sensor coil, influenced by the motion of the rotor, generates a sinusoidal voltage wave which is compared and digitized with respect to two reference voltages to produce first and second streams of essentially rectangular pulses. Both pulse streams are freed of transient noise and are delayed by an adjustable time period.

The first stream of pulses is then phase and width compared with respect to a stream of reference (or desired frequency) pulses generated by an oscillator or the like, and the results of the comparison are used to gradually vary the rotor speed by generating time and position limited accelerating or braking driving pulses. The second pulse stream is used to monitor the rotational speed of the rotor. If the rotor speed falls below a predetermined value, the control circuit enters the self-starting mode wherein the rotor is accelerated in a step-by-step or quasi-continuous manner by the cyclic reswitching and repoling of the driving pulses between the sensor coil and the working coil. When a prescribed rotor speed is attained, the control circuit enters the nominal running mode described above.

Referring now to FIG. 1, which is a schematic diagram of the control circuit described in the above-incorporated U.S. patent application, the control circuit includes a reactive motor 2 having a rotor 21 with permanent magnetic poles and a stator (not shown in more detail) provided with coils 22 and 23. If one of coils 22 and 23 is supplied with driving pulses, rotor 21 may be rotated at a speed dependent upon the frequency of the driving pulses and the number of pole pairs provided on rotor 21. In applications involving time-keeping devices (e.g., clocks, watches, etc.), rotor 21 is mechanically coupled in a conventional manner to a time display device, e.g., the hands of a watch face.

In the nominal running mode, coil 23 is employed as a sensor device to determine the speed of rotor 21. Sensor coil 23, as well as working coil 22, are so disposed adjacent rotor 21 as to be influenced by the magnetic flux of the permanent magnetic poles provided on rotor 21. Accordingly, rotation of rotor 21 induces a sinusoidal voltage $U_n$ in control coil 23, the induced voltage $U_n$ having zero-crossings spaced proportionately to the rotational speed of rotor 21.

The induced voltage signal $U_n$ is derived from the two terminals of coil 23 and is provided, along with two substantially constant reference voltages, $U_r$ and $U_s$, to the inputs of a comparator element 4. Comparator 4 compares the induced sinusoidal voltage sensor signal $U_n$ with the reference voltages $U_r$ and $U_s$ to produce first and second substantially rectangular pulse trains, v and i, whose leading and trailing vertical edges lie at the intersections of the sensor voltage $U_n$ with the reference voltages $U_r$ and $U_s$, respectively. The first and second rectangular pulse trains v and i are utilized to maintain constant the speed of rotor 21 by generating accelerating or braking driving pulses supplied to working coil 22 and to initiate a switchover into the self-starting mode whenever the rotor speed falls below a predetermined value. To this end, rectangular pulse train v is supplied as an input to a noise-suppression and delay element 51, while rectangular pulse train i is suppled as an input to a noise suppression element 521.

Noise-suppression and delay element 51 and noise-suppression element 521 are additionally supplied with timing frequency inputs $f_5$ and $f_1$, respectively, generated and supplied by an oscillator 1, (e.g., a crystal oscillator) and an associated frequency step-down and divider circuit 11, which produces a plurality of timing frequencies $f_n$.

A noise-free rectangular pulse train $i_1$, is provided as an output from noise-suppression element 51 and is supplied to both a phase comparator 6 and a delay element 522. A third timing frequency signal $f_3$ (also generated by oscillator 1 and frequency divider 11) is additionally supplied as an input to delay element 522 which delays pulse train i, to produce as outputs a noise-free and delayed actual frequency signal I and its complementary signal $\bar{I}$.

For purposes of simplification, elements 51, 521 and 522 have been grouped together to form a common noise-suppression and delay element 5 indicated collectively in FIG. 1 by broken lines. In addition to the noise-free (but undelayed) signal $i_1$, there are provided as inputs to phase comparator 6 a fourth frequency timing signal $f_2$ and a desired frequency signal $f_s$ (both derived from oscillator 1 and frequency divider 11), as well as a switchover initiation signal $\beta$ discussed further below. A linkage element 10 receives as inputs the noise-free and delayed actual frequency signals I and $\bar{I}$, two phase comparison signals $Q_1$ and $Q_3$ generated by phase comparator 6 and the switchover initiation signal $\beta$. Linkage element 10 in response (as further described below) generates therefrom and supplies as input to a driving logic circuit 9 the aforementioned accelerating and braking driving pulses for maintaining constant the rotor speed in the nominal running mode.

A self-starting stage 8 is provided with input signals consisting of the noise-free and delayed pulse train V, a prescribable signal N and one or more timing signals $f_{onz}$ of mutually different frequencies. Prescribable signal N is generated as an output of a waiting-time element 7 which is provided with the following input signals: the noise-free and delayed self-starting signal V, the switchover initiation signal $\beta$ and a fourth timing frequency signal $f_4$. Waiting-time element 7 includes one or more delay stages, each delay stage having a reset input terminal and each delay stage being reset synchronously dependent upon the noise-free and delayed self-starting signal V and dependent upon the switchover initiation signal $\beta$.

Self-starting stage 8 generates from the above-described input signals a first pulse train $F_1$ (as well as the complementary pulse train $\overline{F}_1$), a second pulse train $F_2$ (as well as the complementary pulse train $\overline{F}_2$) and the switchover initiation signals $\beta$ and $\overline{\beta}$. The above-mentioned signals generated by self-starting stage 8 are provided to driving logic circuit 9, which produces therefrom switching pulse trains $T_n$ and $S_n$.

Switching pulse trains $T_n$ and $S_n$ are provided as input signals to a switching stage 3 which is electrically interposed between positive and negative voltage sources $+U_B$ and $-U_B$ and coils 22 and 23, and which includes a plurality of electrically activated switches for connecting either of coils 22 and 23 to either the positive voltage source $+U_B$ or the negative voltage source $-U_B$ dependent upon the state of pulse trains $T_n$ and $S_n$.

The basic functioning of the control circuit having been set forth above, reference will now be had to FIG. 2, showing the states of the various signals discussed above.

As shown in FIGS. 2a and 2b, the voltages existing in working coil 22 and control coil 23 are of sinusoidal shape and are mutually offset in phase with respect to one another by 90°. FIG. 2c shows the substantially rectangular pulse train i produced as an output of comparator element 4 by comparing the sinusoidal voltage $U_{23}$ induced in control coil 23 with the reference voltage $U_s$. In FIG. 2, all signals produced by the corect (in the sense of "desired") direction of rotation of rotor 21 have been indicated in solid lines, while signals produced by a reverse rotation of rotor 21 are shown in a broken line format. Actual frequency pulse signal i is initially noise-suppressed in noise-suppression element 521 and is then delayed in delay element 522 to produce the signal I shown in FIG. 2d. It will be noted that the signal I is delayed with respect to the signal i by a time period of $\Delta t$. In FIG. 2e, there is shown a signal I* which corresponds to the signal I delayed by the time $\Delta t$ produced by reverse rotation of rotor 21. The rectangular desired frequency pulses $f_s$ produced by oscillator 1 and frequency divider circuit 11 are shown in FIG. 2(f).

According to the circuit shown in U.S. patent application Ser. No. 213,785, accelerating or braking driving pulses are supplied to working coil 22 to either accelerate or brake the rotation of rotor 21 dependent upon whether the desired frequency pulses $f_s$ lead or trail the actual frequency pulses i.

Referring to FIGS. 2(c), 2(f), and 2(g), in the siutation where the desired frequency pulses $f_s$ lead the actual frequency pulses i, the rising edges of the desired frequency pulses $f_s$ will occur at a time $t_1$, prior to the rising edges of the actual frequency pulses at a time $t_2$. During the intervening time intervals between times $t_1$ and $t_2$, accelerating driving pulses are supplied to working coil 22. Referring most particularly to FIG. 2(g), accelerating driving pulse A is generated in the negative half-wave region beginning with the rising edge of the desired frequency pulse $f_s$ and ending with the rising edge of the actual frequency pulse i. On the other hand, accelerating driving pulse B is generated beginning with the falling edge of the desired frequency pulse $f_s$ and ending with the falling edge of the actual frequency pulse i. In FIG. 2(g), however, accelerating driving pulses A and B are generated only so long as the delayed actual frequency signal I (shown in FIG. 2(d)) is low in the negative half-wave region or high in the positive half-wave region. Accelerating driving pulses A and B are therefore further time-duration limited dependent upon the state of the delayed actual frequency pulses I.

In other words, in the negative half-wave region between $t_1$ and $t_2$, if signal I were to rise, accelerating pulse A would be correspondingly terminated with the rising edge of signal I, while in the positive half-wave region, accelerating pulse B would be similarly cut short with the falling edge of signal I.

In the situation where the actual frequency pulses i lead the desired frequency pulses $f_s$ (i.e., where the actual frequency signal i rises at a time $t_3$ prior to the rising of the desired frequency signal $f_s$ at a time $t_4$), braking driving pulses are generated by short circuiting coil 22 to retard the rotation of rotor 21. Thus, braking driving pulse C begins with the rising edge of signal i and ends with the rising edge of signal $f_s$, while braking pulse D begins with the falling edge of signal i and ends with the falling edge of signal $f_s$.

We refer now to FIG. 3, which is a detailed schematic representation of the various components shown in block format in FIG. 1 for producing the various signals shown in FIG. 2. The various major components of FIG. 1 are grouped by broken lines in FIG. 3.

Comparator element 4 includes two comparators C1 and C2, each having a positive input connected to one end of control coil 23. A negative input to first comparator C1 is supplied with a reference voltage $U_s$, and a negative input terminal of second comparator C2 is connected to a second reference voltage $U_r$ and to the other terminal of control coil 23. Reference voltages $U_r$ and $U_s$ are supplied from a resistance divider including resistors R1, R2 and R3.

The output of comparator C1 provides the signal v which is supplied to noise-suppression and delay stage 51 which includes four timed D flip-flops D1–D4 connected in series and having timing input terminals $C_k$. A timing frequency $f_5$ (e.g., with a frequency of 256 Hz) is synchronously applied to each timing input $C_k$ of flip-flops D1–D4.)

The D input of flip-flop D1 is connected with the output of first comparator C1, and the Q output of flip-flop D1 is connected with the D input of the subsequent flip-flop D4. The Q output of flip-flop D4 is supplied as an input to a first NAND gate G24 and the other input of NAND gate G24 is supplied with the Q output of the first flip-flop D1. The $\overline{Q}$ outputs of the first and last flip-flops D1 and D4 are supplied as inputs to a second NAND gate G26.

Second comparator C2 outputs the signal i which is supplied to noise-suppression stage 521, having three clocked flip-flops D5–D7 connected in series and each having clock inputs $C_k$ to all of which there is applied a clock frequency signal $f_1$ (e.g., having a frequency of 1024 Hz). Similar to stage 51, the D input of first flip-flop D5 is connected with the output of second comparator 42 and is thus supplied with the actual frequency signal i. The Q outputs of flip-flops D5 and D6 are respectively connected with the D input of the subsequent flip-flop D6 or D7. The Q output of flip-flop D7 is supplied as an input to a first NAND gate G28, having a second input connected to the Q output of the first flip-flop D5. A second NAND gate G30 has two inputs which are supplied with the negated outputs $\overline{Q}$ of the first and last flip-flops D5 and D7.

Delay element 522 is constructed similarly to noise-suppression and delay stage 51 and includes flip-flops D8–D11 having clock inputs $C_k$ to which there is synchronously applied a third timing frequency $f_3$ equal to 256 Hz. The construction of elements 51, 521 and 522 is such that they have the following structural similarities in common:

The outputs of a first and a second NAND gate (i.e., G24, G26, and G28, G30) are applied to the inputs of a third and a fourth NAND gate (G25, G27 and G29, G31) the third NAND gate having an input which is connected to the output of the fourth NAND gate, and the fourth NAND gate having an input which is connected to the output of the third NAND gate. For example, the output of gate G27 is supplied as an input to gate G25, and the output of gate G25 is supplied as an input to gate G27, etc.

The output signal V of noise-suppression and delay stage 51 which is obtained as the output signal of NAND gate G25 is supplied as an input to self-starting stage 8. The noise-free (but as yet undelayed) actual frequency $i_1$ is obtained as the output signal of NAND gate G29 and is supplied as an input to both phase comparator 6 and delay stage 522. The two complementary noise-free and delayed signals I and $\overline{I}$ are obtained as the outputs of flip-flop D11 and are supplied as inputs to linkage logic circuit 10.

Phase comparator 6 includes two clocked D flip-flops D14 and D15 each having a clock input $C_k$ to which is applied another clock frequency $f_2$ equal to 4096 Hz. The desired frequency signal $f_s$ (e.g., 16 Hz) is applied to the D input of flip-flop D14, and the noise-free actual frequency signal $i_1$ is supplied to the D input of the second flip-flop D15. The Q output of each flip-flop D14 and D15 is apppplied as an input to an exclusive OR gate G39 and G40. The other input of gate G39 is supplied with the desired frequency signal $f_s$, while the other input of gate G40 is supplied with the noise-free actual frequency signal $i_1$. Two further NAND gates G41 and G42 are provided. Gate G41 is supplied as inputs with the output of gate G39 and the inverted output signal from gate G40 inverted by an inverter G43. Gate G42 is supplied as inputs with the output of gate G40 and an inverted version of the output signal from gate G39 inverted by an inverter G44. The outputs of gates G41 and G42, an inverted version of timing frequency $f_2$ provided by an inverter G45, and the switchover signal are all supplied as inputs to a shift register circuit including six J/K flip-flops J1–J6, ten OR gates G70–G79 and two inverters G80 and G81.

Each J/K flip-flop J1–J6 has a setting input S to which is applied the switchover initiation signal $\beta$. Each flip-flop J1–J6 also has a clock input $C_k$ to which is supplied an inverted version of the clock frequency $f_2$. The J input of the first flip-flop J1 is connected to the output of inverter G81, and the J inputs of the second through sixth flip-flops J2–J6 are connected to the respective outputs of OR gates G74–G70. Each K input of the first five flip-flops J1–J5 is connected with the respective output of five OR gates G79–G75. On the other hand, the K input of the sixth flip-flop J6 is connected with the output of inverter G80. One input of each of OR gates G70–G74 and the input of inverter G81 are each supplied with the signal output from first NAND gate G41. The other input of each of OR gates G70–G74 is connected to the negated output terminal $\overline{Q}$ of the respective preceding J/K flip-flop J1–J5. One input of each of OR gates G75–G79, as well as the input of inverter G80, are supplied with the signal output from second NAND gate G42, while the other input terminal of each of OR gates G75–G79 is connected to the output terminal Q of the respectively subsequent J/K flip-flop J2–J6.

Braking and accelerating pulses $Q_A$, $Q_B$ and $Q_C$ are tapped at the outputs terminals Q of the third, fourth and fifth flip-flops J3–J5 and are supplied therefrom to linkage logic circuit 10.

Linkage logic circuit 10 includes eight NAND gates G52, G56, G53, G57, G60, G54, G61 and G58 which are supplied with input signals as follows:
(a) gate G52: signals $\overline{I}$ and $Q_C$;
(b) gate G56: signals $Q_B$ and I;
(c) gate G53: output signal from gate G52 and signal $Q_A$;
(d) gate G57: output signal from gate G56 and signal $Q_A$;
(e) gate G60: the switchover initiation signal $\beta$, signal $\overline{I}$ and signal $Q_C$;
(f) gate G54: output signal from gate G53 and the switchover initiation signal $\overline{\beta}$;
(g) gate G61: switchover initiation signal $\overline{\beta}$, signal $Q_B$ and I; and
(h) gate G58: output signal from gate G57 and the switchover initiation signal $\overline{\beta}$.

The noise-free and delayed self-starting signal V output from stage 51, a frequency timing signal $f_{onz}$ and a timing signal N output from waiting-time element 7 are provided as input to self-starting stage 8. Waiting time element 7 includes two delay stages TR1 and TR2 which are reset synchronously by signals V and $\beta$.

Self-starting stage 8 includes three T flip-flops TR3–TR5, the input of the first T flip-flop TR3 being provided with the timing signal N generated by waiting time element 7 and the inputs of the remaining two T flip-flops TR4 and TR5 being connected to the Q output of the preceding flip-flop. The Q output of the last T flip-flop TR5 together with a 16 Hz frequency signal are provided as input to a NAND gate G90, the output signal of which, together with the output signal from the third T flip-flop TR5, are applied as inputs to a multivibrator stage G91 consisting of two NAND gates G14 and G15 interconnected in a manner well known in the art. The complementary switchover signals $\beta$ and $\overline{\beta}$ are present at the outputs of multivibrator stage G91.

The reset signal for the two T flip-flops TR1 and TR2 comprising waiting time element 7 and the three T flip-flops TR3–TR5 comprising self-starting stage 8 are generated analogously to the circuit according to FIG. 3. The outputs Q and $\overline{Q}$ of the divider stages TR1 and TR2 included in waiting time element 7 provide various frequency timing signals by dividing an inputed timing frequency of, for example, 16 Hz down to 8 Hz or 4 Hz to thereby generate the signals $F_1$, $\overline{F}_1$, and $F_2$ and $\overline{F}_2$. The signals generated as output from self-starting stage 8 and from linking logic circuit 10 are provided as input to driving logic circuit 9 to thereby activate the switches S1–S8 of switching element 3 according to the following truth table.

| Driving Signals | | | | | | FET Switches | | | | | | | |
|---|---|---|---|---|---|---|---|---|---|---|---|---|---|
| β̄ | Qc | QB | QA | I | Ī | S1 | S2 | S3 | S4 | S5 | S6 | S7 | S8 |
| H | L | L | H | X | X | OFF | OFF | OFF | OFF | OFF | OFF | OFF | OFF |
| H | L | L | L | X | X | ↓ | ↓ | OFF | ↓ | ↓ | ↓ | ON | ON |
| H | L | L | H | X | X | ↓ | ↓ | OFF | ↓ | ↓ | ↓ | OFF | OFF |
| H | L | H | H | H | L | ↓ | ↓ | ON | ↓ | ↓ | ↓ | ON | OFF |
| H | L | H | H | L | H | ↓ | ↓ | OFF | ↓ | ↓ | ↓ | OFF | OFF |
| H | H | H | H | H | L | ↓ | ↓ | ON | OFF | ↓ | ↓ | ON | OFF |
| H | H | H | H | L | H | OFF | OFF | OFF | ON | OFF | OFF | OFF | ON |

The functioning of the circuit shown in FIG. 3 will now be explained in more detail, reference being had to FIG. 4, wherein the following signals are shown:

(a) the self-starting signal V,
(b) a 16 Hz. timing frequency signal provided as shown in FIG. 3, to waiting time element 7,
(c) the reset signal provided to T flip-flops TR1 and TR2 of waiting time element 7 and T flip-flops TR3–TR5 of self-starting stage 8,
(d) the output signals of T flip-flops TR1–TR5,
(e) the output signal α generated by waiting time element 7,
(f) the output signal γ generated by NAND element G90,
(g) the switchover initiation signal β, and
(h) the voltage at coils 22 and 23 of reactive motor 2.

If the speed of rotor 21 falls below a certain limit, and correspondingly the signal V fails to reach the high potential state for a certain time interval, then the common reset input terminal R of flip-flops TR1–TR5 making up waiting time element 7 and self-starting stage 8 remains low during this time interval.

It is here presupposed that the switchover initiation signal β was in the low potential state during the preceding operation of the circuit and that at least one of the two output signals α or the negated output signal of the second T flip-flop of self-starting stage 8 was in the state of high potential. Throughout the total time interval considered here, signal V is in the low potential state, as a result of insufficient rotational speed of rotor 21.

Referring to FIG. 4, as signal V moves from a high to a low state at time $t_0$, the reset signal also falls at time $t_0$ (FIG. 4(c)). As a result, flip-flops TR1–TR5 are effectively switched to divide down the 16 Hz timing frequency signal (FIG. 4(b)) to yield the signals shown in FIG. 4(d) which represent the negated outputs of flip-flops TR1–TR4 and the Q output of flip-flop TR5. As long as the Q output of flip-flop TR5 is in a state of low potential, a signal γ corresponding to the timing frequency of 16 Hz is generated at the output of gate G90. If the self-starting signal V remains in a low potential state over a given time interval, flip-flop G91 becomes set, resulting in the switchover initiation signal β assuming the high potential state at the instant $t_1$. The negated switchover initiation signal β̄ correspondingly assumes a state of low potential. With the switchover initiation signal β in a state of high potential, resetting of flip-flops TR1–TR5 is prevented since the flip-flop reset signal remains low so long as β is high. So long as β remains high, the control circuit will operate in the self-starting mode, wherein rotor 21 is driven by both coils 22 and 23.

The driving signals supplied to coils 22 and 23 during the self-starting mode of operation are shown in FIG. 4(h) and are generated by the driving logic circuit from the signals delivered thereto from the outputs Q and Q̄ of the first and second T flip-flops TR1 and TR2. As a result, switches S1–S8 are switched according to the switching table set forth above and coils 22 and 23 are supplied with driving pulse signals as shown in FIG. 4(h) betweeen times $t_1$ and $t_2$.

If the Q output of flip-flop TR5 is in a state of low potential, flip-flop G91 after another 16 Hz. frequency cycle is set to low with the switchover initiation signal β and is set to high with the negated switchover initiation signal β̄. At time $t_2$, this implies a changeover from the self-starting mode of operation to the nominal running mode of operation. This type of pulse linkage results in the last self-starting pulse having half the width (and corresponding to the 16 Hz timing frequency signal) of the preceding self-starting pulses. [See the last driving pulse in FIG. 4(h) prior to time $t_2$.] At time $t_3$, a signal shown in FIG. 4(e) is emitted at the negated output of flip-flop TR2. This causes the generation of a reset pulse shown in FIG. 4(c), the falling edge of which occurs at time $t_4$. Accordingly, the self-starting mode of operation is terminated and, in the subsequent nominal running mode of operation, coil 23 is used as a control coil to generate the signals V and I as described above.

In the known arrangement thus described, after the self-starting mode of operation has been terminated, the circuit switches over to the nominal running mode of operation with a 32 Hz regulation cycle in which both edges of the desired frequency pulses and actual frequency pulses are decoded. Such a nominal running mode of operation provides very rapid regulation, since both half-waves are taken into account. However, such a strict mode of regulation sometimes proves to be inefficient, in that control oscillations can occur causing the system to consume too much current. Since regulation is provided in both half waves, appropriate accelerating or braking driving pulses are delivered to the working coil, and the voltage supply is correspondingly heavily loaded.

SUMMARY OF THE INVENTION

One aim of the present invention is to provide a method and apparatus for controlling and regulating a timing motor having a permanent magnetic rotor to guarantee stable regulation and low current consumption.

In one aspect, the invention features a method and apparatus for providing that, following a switchover from the self-starting mode to the nominal running mode of operation, during a transitional period, for a specified time interval, the actual frequency pulses generated by the control coil are compared with the design frequency pulses at a monitoring frequency that is a multiple of the monitoring frequency employed during the nominal running mode of operation after expiration of the specified time interval.

Preferably, during the transitional period, both the rising and falling edges of actual frequency pulses are detected and correlated, whereas, during the nominal running mode of operation, only the falling edges of the pulses are detected and correlated and only accelerating driving pulses are supplied to the working coil.

The present invention will now be described by way of a preferred embodiment, reference being had to the accompanying drawings. wherein:

DESCRIPTION OF THE PREFERRED EMBODIMENT

Figure 3:
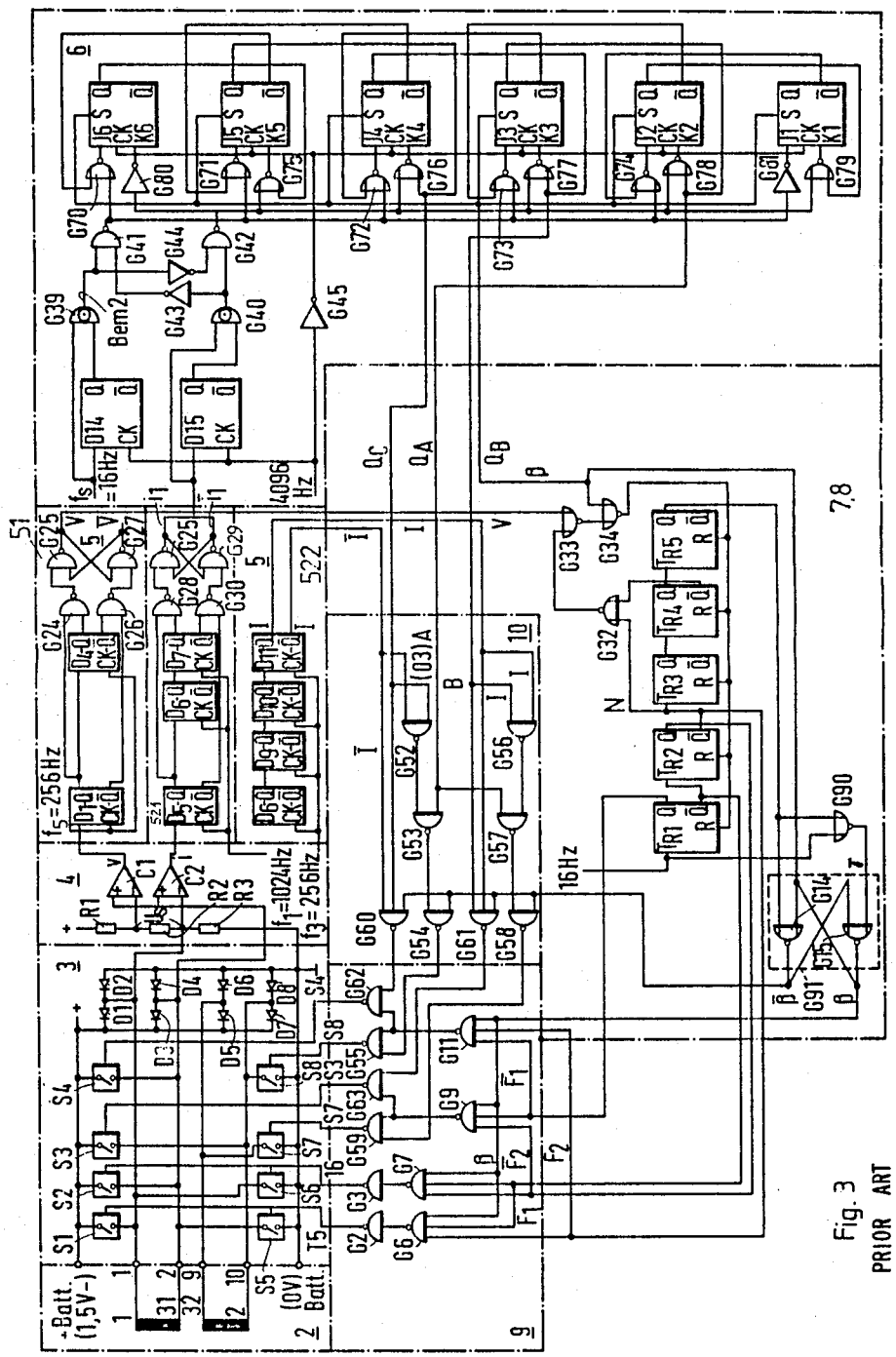
Figure 4:
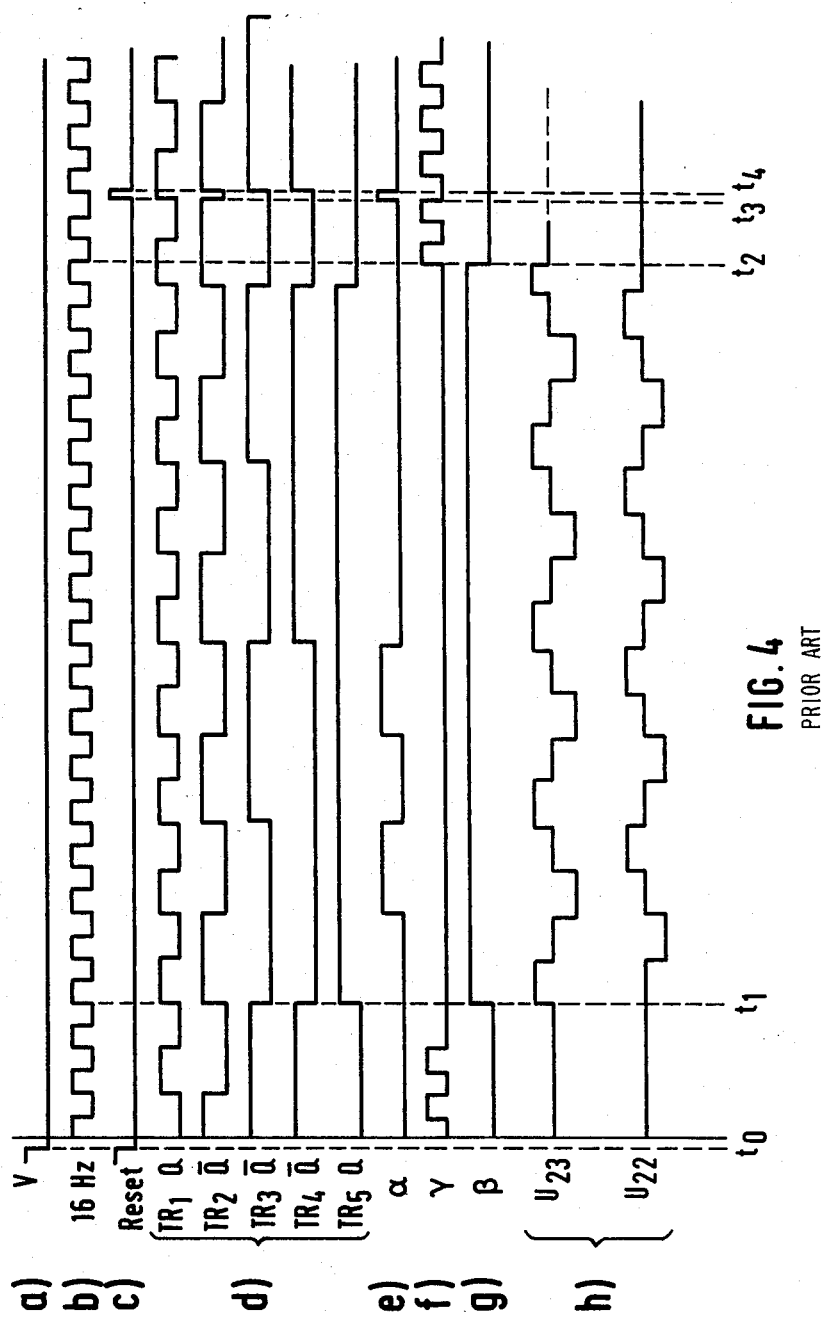

The circuit shown in FIG. 5, with the exception of the differences hereinafter discussed, basically corresponds to the circuit shown in FIG. 3, the same reference numerals being used in both drawings to identify similar elements. Only the differences embodied in the FIG. 5 circuit as compared with the circuit shown in FIG. 3 will be discussed, and reference is hereby made to the preceding discussion of the FIG. 3 circuit as to the structure and operation of components common to both circuits.

Figure 5:
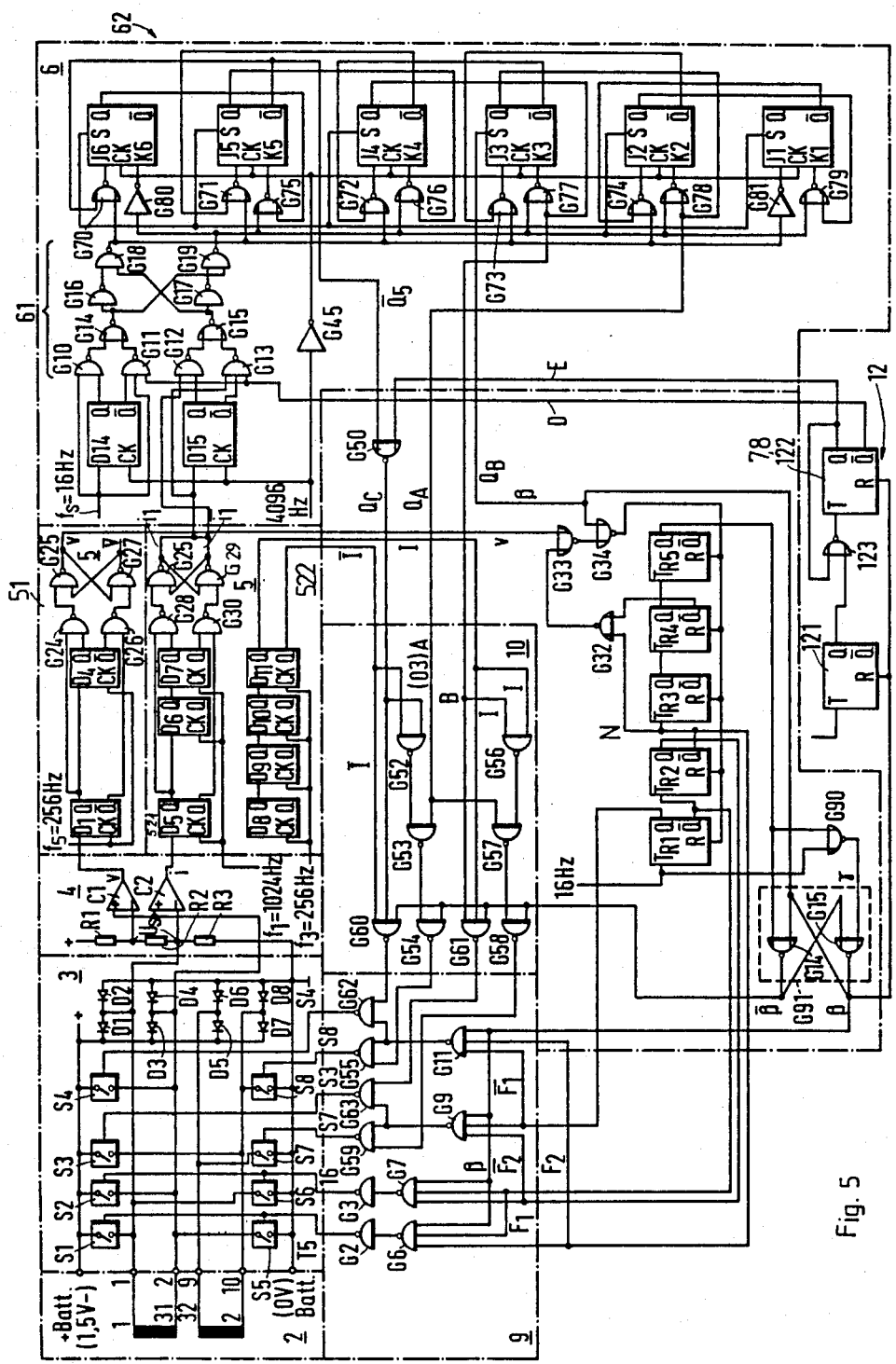
FIG. 5 is a detailed schematic diagram of a control circuit for a timing motor embodying the present invention.

In the embodiment shown in FIG. 5, the control circuit is provided with an additional timing stage 12 and a modified interlock circuit 61 included in phase comparator 6. Additionally, control signal $Q_C$ is formed by linking the output signal $\overline{Q}_5$ of shift register 62 with an output signal E generated by timing stage 12.

Timing stage 12 includes two T flip-flops 121 and 122 each having a reset input to which is applied the switch-over initiation signal $\beta$. The T input of flip-flop 121 is supplied with a frequency timing signal of 1 Hz while the Q output of flip-flop 121 is connected to a first input of a NAND gate 123, the other input of gate 123 being connected with the Q output of flip-flop 122. The output of NAND gate 123 is connected to the T input of flip-flop 122. The Q output and a $\overline{Q}$ output of the flip-flop 122 supply signals E and D, respectively. Signal E generated by the Q output of flip-flop 122 is provided as one input to a NAND gate G50, the other input to gate g50 being the signal $\overline{Q}_5$ output from shift register 62. Gate G50 generates as output the control signal $Q_C$.

Interlock circuit 61 is connected to the outputs of D flip-flops D14 and D15, the D signal output by timing stage 12, the output of noise suppression element 5 and the 16 Hz timing frequency signal. Interlock circuit 61 includes four AND gates G10-G13. The output of gates G10 and G11 are supplied as inputs to a NOR gate G14 and correspondingly, the outputs of gates G12 and G13 are provided as inputs to an additional NOR gate G15. The outputs of gates G14 and G15 are inverted by inverters G16 and G17, respectively, and are then supplied as first inputs to NAND gates G18 and G19, respectively. The second input to gate G18 is supplied with the non-inverted output from gate G15, and correspondingly, the second input to gate G19 is provided with the non-inverted output from gate G14. Similar to the circuit shown in FIG. 3, the outputs of NAND gates G18 and G19 are connected as inputs to shift register 62.

The inputs of AND gates G10-G13 of interlock circuit 61 are supplied with the following signals:

The inputs of gate G10 are supplied with a 16 Hz signal and the Q output of flip-flop D14;

The inputs of gate G11 are supplied with a 16 Hz signal, the negated output $\overline{Q}$ of flip flop D14, and the D output signal generated by timing stage 12;

The inputs of gate G12 are supplied with the negated output signal $I_1$ of the noise-suppression and delay stage, and the Q output signal of flip-flip D15; and Finally, the inputs of gate G13 are supplied with the output signal $i_1$ of the noise suppression and delay stage, the negated output signal $\overline{Q}$ of flip-flop D15, and the D output signal of timing stage 12.

Figure 6:
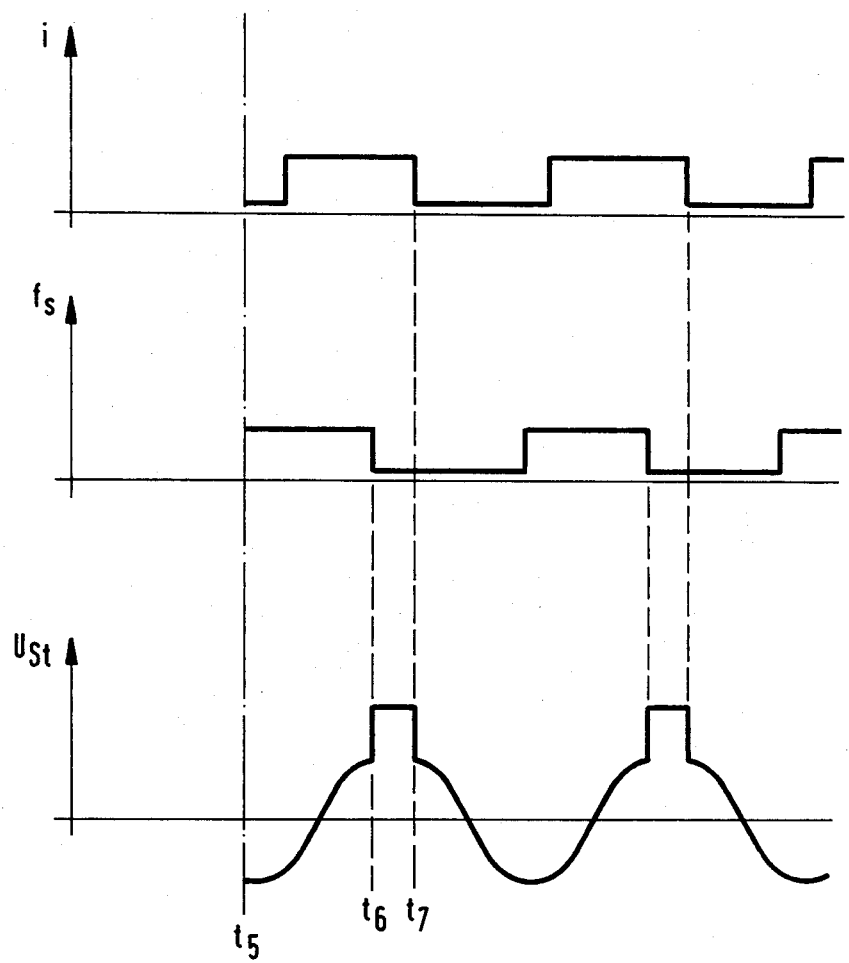
FIG. 6 is a plot of various signals generated by the circuit shown in FIG. 5.

We turn now to FIG. 6 for an explanation of the operation of the circuit shown in FIG. 5.

FIG. 6 shows, from top to bottom, time plots of the actual frequency signal i, the design frequency signal $f_s$, and the rotor driving signal supplied to working coil 22.

Figure 1:
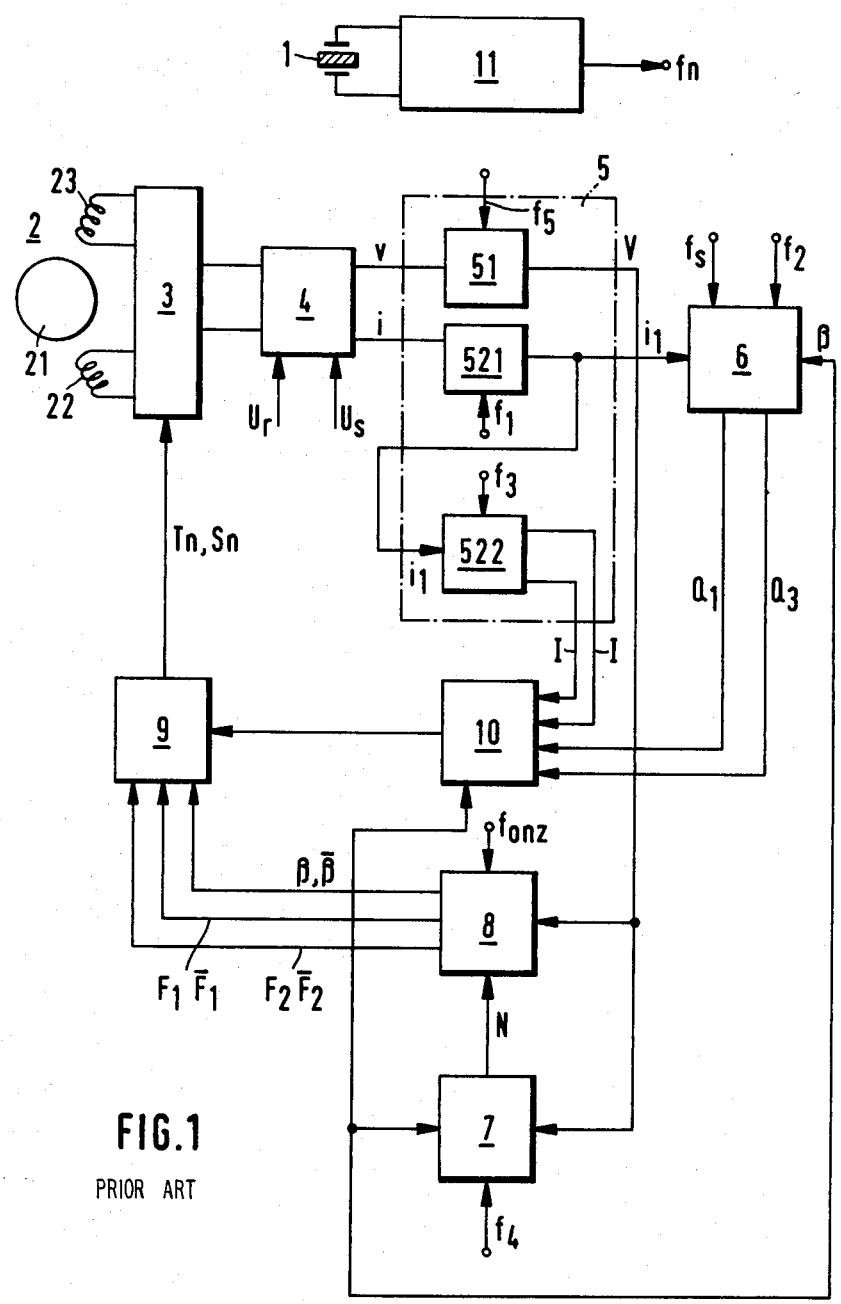
FIGS. 1-4 are Prior Art
Figure 2:
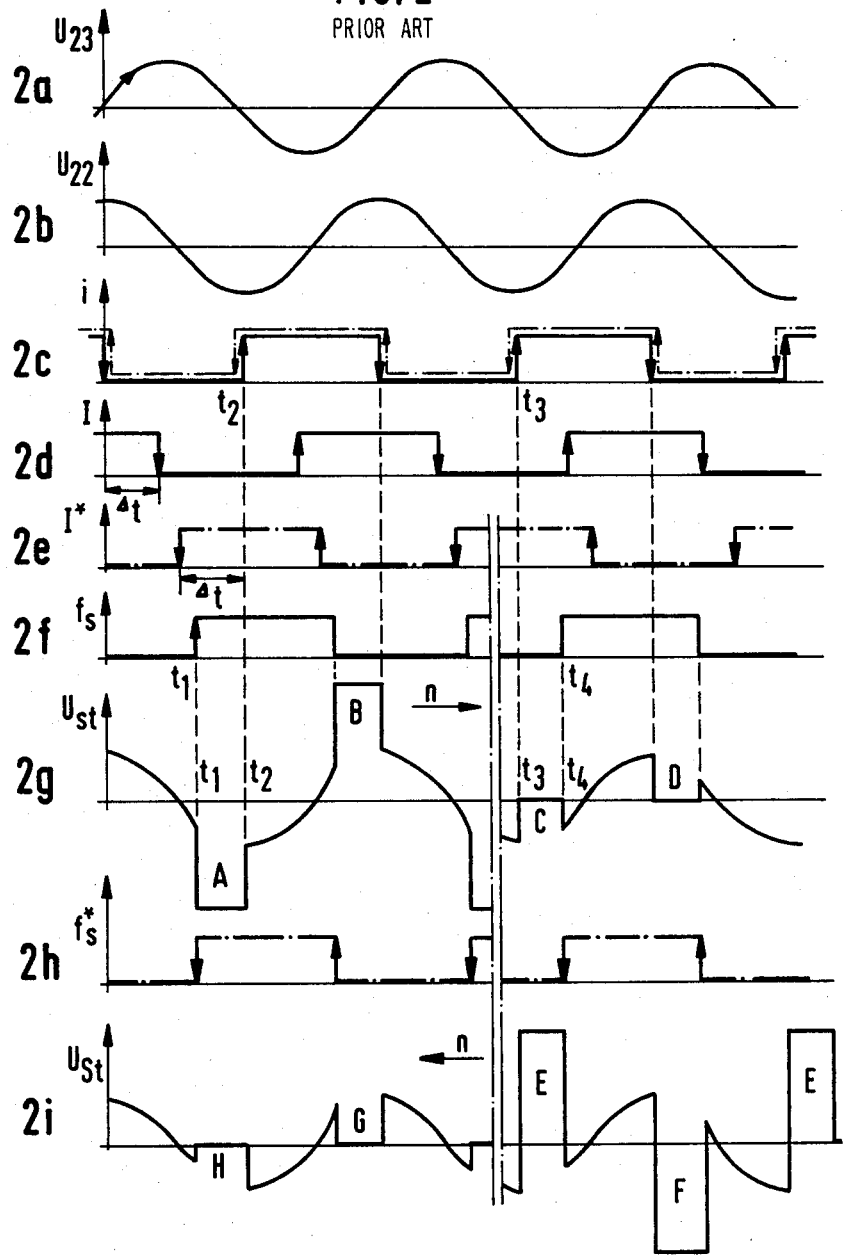

After termination of the self-starting mode of operation at time $t_2$ (i.e., when the switchover initiation signal $\beta$ goes low) and for a time interval of from 1 to 2 seconds, signal E generated by timing stage 12 assumes a state of high potential, and signal D, also generated by timing stage 12, assumes a low potential. During this time interval, the circuit of FIG. 5 generates accelerating or braking driving pulses on a 32 Hz. regulation cycle according to the time plots depicted in FIG. 2.

However, following expiration of this predetermined time interval (i.e., at time $t_5$ shown in FIG. 6) with the output signals E high and D low of timing stage 12, only the falling edges of the actual frequency pulses $i_1$ and the design frequency pulses $f_s$ are decoded in interlock circuit 61 and then transmitted to shift register 62. As a result, the signal $Q_C$ generated by NAND gate G50 remains low, and only positive pulses are delivered to working coil 22. As shown in FIG. 6, accelerating driving pulses beginning at a time $t_6$ with the falling edge of the design frequency pulses $f_s$ and ending at a time $t_7$ with the falling edge of the actual frequency pulses i are delivered to coil 22. Alternatively, if the actual frequency pulses i lead with respect to the design frequency pulses $f_s$, braking driving pulses are supplied to coil 22. The correlation of the various signals in timing stage 12, interlock circuit 61, and of the control signal $Q_C$ is such that the following truth table applies:

| Signal Time Duration | Decoded Pulse Edges $f_s$ and i | | | | Driving Pulses as a function of $Q_A$, $Q_B$, $Q_C$, I, $\overline{I}$ |
|---|---|---|---|---|---|
| | E | D | Rising | Falling | Level $Q_C$ | |
| About 1 to 2 seconds after completion of self-start ($t_2$-$t_5$) | L | H | Yes | Yes | depends on gate G50 | Positive or negative pulses as a function of $Q_B$, $Q_C$, I, $\overline{I}$. |
| Unlimited $t_5 \to \infty$ | H | L | No | Yes | always low | only positive pulses as a function of $Q_B$. |

While the present invention has been illustrated through a description of a preferred embodiment, various substitutions of equivalents may be affected which do not depart from the spirit or the scope of the invention as set forth in the following claims.

What is claimed as new and desired to be secured by Letters Patent of the United States is:

1. An apparatus for controlling and regulating the rotational speed of a motor having a permanent-magnetic rotor with at least one pair of magnetic poles and a stator with at least first and second coils, said first coil being provided with driving pulses and said second coil being utilized as a control coil for providing a sinusoidal voltage corresponding to the motion of said rotor with respect to said stator in a nominal running mode, said apparatus comprising:

(a) comparator means for providing first and second sequences of substantially rectangular pulses by comparing said sinusoidal voltage with first and second reference voltages;

(b) oscillator and frequency divider means for generating a plurality of frequency signals, including a reference frequency signal;

(c) nominal running mode regulation means for correlating, at a first correlation frequency, said first sequence of pulses and said reference frequency signal with respect to phase and time duration and for generating and supplying to said second coil accelerating or braking driving pulses having a phase and time duration corresponding to the phase offset and time duration differential between said first pulse sequence and said reference frequency signal;

(d) mode switchover initiation means for monitoring said second pulse sequence to determine the rotational speed of said rotor and for initiating a self-starting mode of operation whenever said rotor speed falls below a predetermined value;

(e) self-starting mode control means, responsive to said mode switchover initiation means, for alternately reswitching and repoling driving pulses between said first and second coils for a given time period to thereby accelerate the rotational speed of said rotor; and (f) mode transition control means, operable following the expiration of said given time period and for a predetermined transitional time interval, for correlating said first pulse sequence and said reference frequency pulses at a second frequency which is a multiple of said first correlation frequency and for generating and supplying said accelerating and braking pulses to said working coil at said second correlation frequency and for thereafter switching over into said nominal running mode of operation.

2. An apparatus according to claim 1, wherein said transitional mode control means includes means for detecting and correlating both the rising and falling edges of said actual frequency pulses and said reference frequency pulses, and wherein said nominal running mode control means detects and correlates only the falling edges of said actual frequency pulses and said reference frequency pulses and supplies only accelerating driving pulses to said working coil.

3. An apparatus according to claim 2, wherein said comparator means includes:

a phase comparator (6) having a first timed flip-flop (D14) with a D input supplied with said reference frequency pulses, and a second timed flip-flop (D15) with a D input supplied with said actual frequency pulses, each of said first and second timed flip-flops having a timing input supplied with another of said timing frequency signals, said comparator (6) also including a shift register (62), and wherein said transitional mode control means comprises:

(a) an interlock circuit (61) interposed between the outputs of said first and second timed flip-flops and said shift register; and (b) timing stage means for specifying said predetermined time period and for delivering a first control signal (d) to said interlock circuit and a second signal (E) to a first input of a NAND gage (G50) having a second input connected with an output ($Q_5$) of said shift register;

(c) such that said driving pulses supplied to said working coil satisfy the following truth table:

| Signal Time Duration | E | D | Decoded Pulse Edges $f_s$ and i Rising | Falling | Level $Q_C$ | Driving Pulses as a function of $Q_A$, $Q_B$, $Q_C$, I, Ī. |
|---|---|---|---|---|---|---|
| About 1 to 2 seconds after completion of self-start ($t_2$-$t_5$) | L | H | Yes | Yes | depends on gate G50 | Positive or negative pulses as a function of $Q_B$, $Q_C$, I, Ī. |
| Unlimited $t_5 \to \infty$ | H | L | No | Yes | always low | only positive pulses as a function of $Q_B$. | wherein:

$f_s$ = said reference frequency pulses;

i = said actual frequency pulses;

I = a delayed version of said actual frequency pulses;

Ī = the complement of I;

$Q_c$ = the output of said NAND gate (G50);

$Q_B$ and $Q_c$ = sequential outputs of said shift register;

$t_2$-$t_5$ = said predetermined transitional time period; and $t_5 \to \infty$ = a time period following said predetermined transitional time period.

* * * * *